(12) United States Patent
Zimmerman

(10) Patent No.: US 7,147,560 B2
(45) Date of Patent: Dec. 12, 2006

(54) SELECTION OF TARGETS FOR ATTACHMENT

(75) Inventor: Christopher A. Zimmerman, Bellevue, WA (US)

(73) Assignee: Sony Computer Entertainment America Inc., Foster City, CA (US)

( * ) Notice: Subject to any disclaimer, the term of this patent is extended or adjusted under 35 U.S.C. 154(b) by 764 days.

(21) Appl. No.: 10/438,692

(22) Filed: May 14, 2003

(65) Prior Publication Data
US 2004/0229669 A1 Nov. 18, 2004

(51) Int. Cl.
*A63F 13/00* (2006.01)

(52) U.S. Cl. .......................................... 463/25; 463/33

(58) Field of Classification Search .................. 463/25, 463/31, 33, 32, 43; 395/125, 152; 273/317.1
See application file for complete search history.

(56) References Cited

U.S. PATENT DOCUMENTS 6,336,864 B1 * 1/2002 Nakanishi .................... 463/33
6,494,784 B1 * 12/2002 Matsuyama et al. ........... 463/6
6,712,703 B1 * 3/2004 Miyamoto et al. ............ 463/43

* cited by examiner

*Primary Examiner*—Xuan M. Thai
*Assistant Examiner*—Alan Cross
(74) *Attorney, Agent, or Firm*—Frommer Lawrence & Haug LLP; William S. Frommer

(57) ABSTRACT

Methods and apparatus for selection of a target for attachment. In one implementation, a method of selecting a target for attachment by a moving character in a video game, wherein the character has a position and a velocity, includes: selecting one of a plurality of attachable objects as a candidate object, wherein each attachable object is of an object type from among one or more object types; determining if the candidate object is available according to the current position of the character and the object type of the candidate object; and if the candidate object is available, determining a cost for the candidate object according to the position and velocity of the character and the object type of the candidate object, wherein the cost represents an acceleration to attach the character to the candidate object.

33 Claims, 9 Drawing Sheets

SELECTION OF TARGETS FOR ATTACHMENT

BACKGROUND

In many video games played on video game systems, a player controls the movement of a character in a game environment using a manual controller. In response to commands input to the controller, the video game system updates data and data structures representing the position and movement of the character and presents the results to the player. In addition to commands from the player, the video game system typically uses a physics engine or model to simulate the effects of movement, actions, and events that affect the character and the environment.

In one type of common situation in many video games, the player attempts to cause the character to jump from one location and land at another desired location. However, it is often difficult for a player to control the character to jump and land as desired.

SUMMARY

The present disclosure provides methods and apparatus for selection of a target for attachment. In one implementation, a method of selecting a target for attachment by a moving character in a video game, wherein the character has a position and a velocity, includes: selecting one of a plurality of attachable objects as a candidate object, wherein each attachable object is of an object type from among one or more object types; determining if the candidate object is available according to the current position of the character and the object type of the candidate object; and if the candidate object is available, determining a cost for the candidate object according to the position and velocity of the character and the object type of the candidate object, wherein the cost represents an acceleration to attach the character to the candidate object.

In another implementation, a computer program, stored on a tangible storage medium, for use in selecting a target for attachment by a moving character in a video game, wherein the character has a position and a velocity, includes executable instructions that cause a computer to: select one of a plurality of attachable objects as a candidate object, wherein each attachable object is of an object type from among one or more object types; determine if the candidate object is available according to the current position of the character and the object type of the candidate object; and if the candidate object is available, determine a cost for the candidate object according to the position and velocity of the character and the object type of the candidate object, wherein the cost represents an acceleration to attach the character to the candidate object.

DETAILED DESCRIPTION

Figure 1:
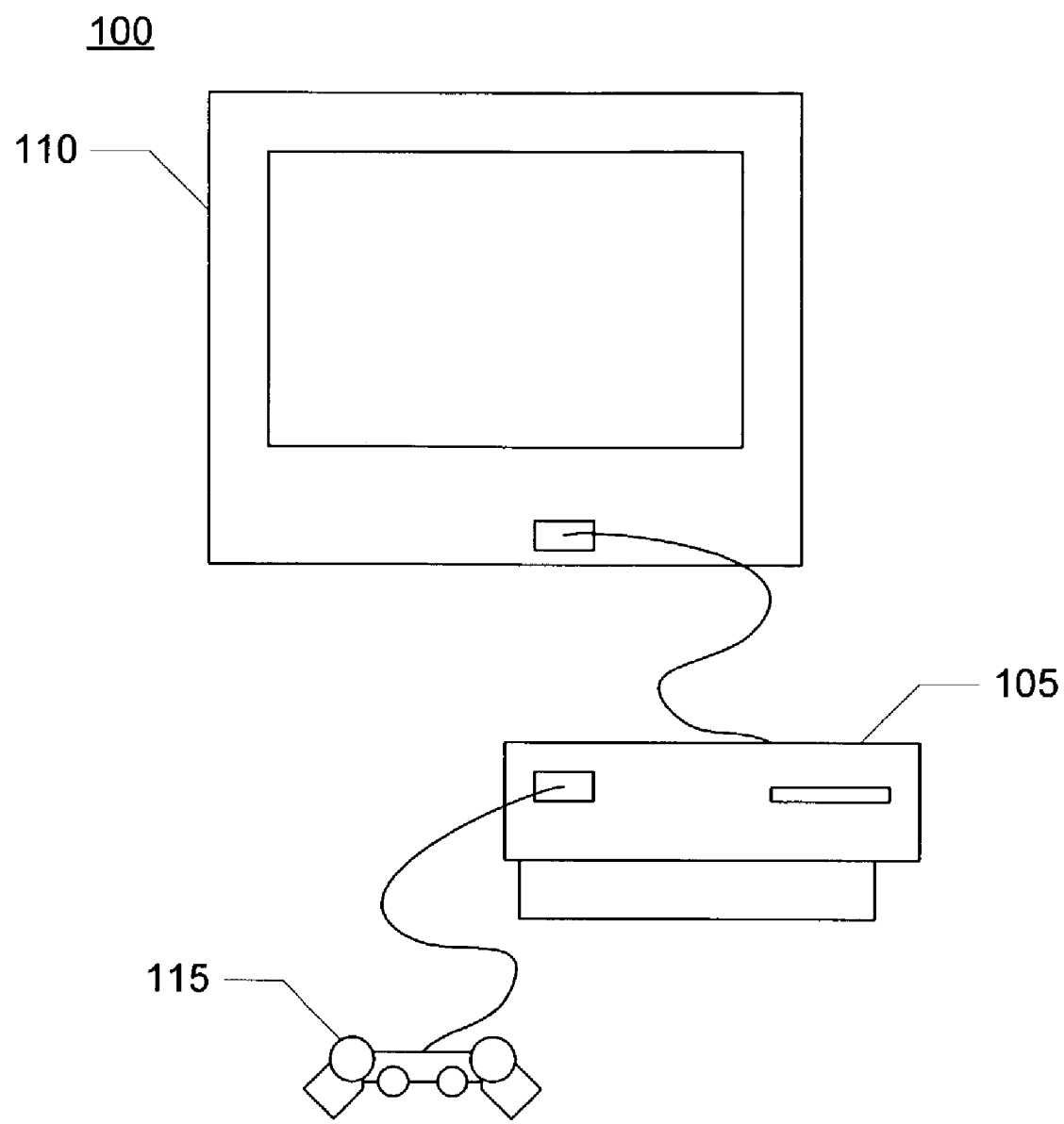
FIG. 1 shows a representation of one implementation of video game system.

The present invention provides methods and apparatus for selection of a target for attachment. In one implementation, a computer system executing a video game selects from among multiple objects a target object to which a moving character will attach. The computer system evaluates the position and movement of the character and the position and movement of the objects, and then determines which of the objects has the most desirable cost for selection. For example, in one implementation, the computer system selects the object for which the least change is to be applied to the character's current path of movement to attach the character to that object.

An example of the operation of one implementation is described here for illustration. In this example, a video game system provides a representation of a three-dimensional environment including one or more characters and one or more objects (e.g., in one or more data structures) and supports a physics engine (e.g., as a software component or tool) to represent the position and movement of characters and objects within the environment. A player controls the actions and movement of a player character using inputs of a manual controller (e.g., a joystick and one or more push buttons). The player can cause the character to walk, run, and jump, among other actions. When the character jumps, the physics engine determines the path that the character will follow through the environment based on the character's initial position and movement and the environment, as well as the position and movements of other characters and objects. The path may cause the character to land upon another object. Often, however, the path may not indicate landing precisely upon another object, but rather passing near an object.

The player can use a select target command to assist the character to land upon a nearby object while jumping or falling. The player can also use the select target command to cause the character to grab or hold onto a nearby object as the character passes by the object. Accordingly, some objects in the environment are defined as being objects to which the character can be attached by landing or grabbing. These objects are attachable objects. To attach a character to an attachable object, the video game system changes the path of the character to place the character in the proper landing or grabbing position for that object. However, there may be multiple objects to which the character could be attached as the character is jumping or falling.

When the character has jumped and the player inputs the select target command, the video game system evaluates the nearby attachable objects to determine which object to select for attachment. For example, the video game system uses a maximum distance or height differential beyond which attachable objects are considered too far for attachment. For each of the available attachable objects, the video game system determines a cost for attaching the character to that object. The cost represents an amount of change that would be applied to that character's movement to attach the character to the object. For example, the video game system builds a path from the character's current position to the attachment point on the attachable object and determines the amount of acceleration needed to modify the character's current movement to follow that path. The video game system also applies adjustments to costs, such as to avoid landing on the same object from which the character has just jumped. The video game system selects the available object with the lowest cost (least change) as the selected target object. The video game system adjusts the character's movement along the path built for the selected target object and causes the character to move through the environment to attach to the selected target object.

In this example, an attachable object is one of the following types: a spire, a rail, a handle, or a pipe. A spire is for landing and has a single attachment point at its peak. A rail is for landing and has a straight or curved line of attachment points (possibly including discontinuities such as a zig-zag). A handle is for grabbing and has a single attachment point (e.g., a hook). A pipe is for grabbing and has a straight or curved line of attachment points (possibly including discontinuities such as a zig-zag). The video game system uses different techniques to determine the availability and cost for the different types of attachable objects. For example, the cost for landing on a spire is the cost for landing on the one attachment point of the spire, while the cost for landing on a rail is the minimum cost for landing on any of the points of the rail. If a rail is the selected target object, the character is attached to the attachment point corresponding to the previously found minimum cost for the rail. The cost for grabbing a handle is the cost for moving the character so that the one attachment point of the handle is at a reach distance of the character (where the reach distance reflects a distance from the character's position to which the character can reach to grab, such as using a hand or a tool). The cost for grabbing a pipe is the minimum cost for moving the character to grasp one of the attachment points of the pipe, similar to the distinction between landing on a spire versus landing on a rail. In other examples, additional types of objects are available, such as shapes for the character to press back against or hide behind (e.g., a wall or a column) defined by a series of attachment points and corresponding animations.

For example, as the character is running along the ground of the environment, the player causes the character to jump. While the character is in the air from jumping, the player presses the button for selecting a target. The character is passing over a spire and below a pipe. The video game system confirms that both the spire and the pipe are close enough for attaching. The video game system determines the cost for attaching the character to the spire and the cost for attaching the character to the pipe. The cost for attaching the character to the spire reflects the cost of adjusting the character's path to land on the attachment of the spire. The cost for attaching the character to the pipe reflects the cost of adjusting the character's path to grab the attachment point which has the minimum cost among the attachment points of the pipe. In this example, the cost for the spire is lower, so the video game system changes the characters movement to cause the character to land on the attachment point of the spire.

FIG. 1 shows a representation of one implementation of video game system 100. A video game console 105 is connected to a display device 110, such as a television. The console 105 is also connected to a manual controller 115. The console 105 includes hardware and software components to execute a video game program. The console 105 also includes a media reader. A removable storage device or piece of removable storage media storing a video game program is inserted into the media reader of the console 105. The console 105 reads the video game program from the media and executes the video game program. The console presents the results of the video game program execution on the display 110. As the program executes, a player can input control commands through controller 115 to affect the execution and results of the video game program. In one example, the console is a PlayStation2™ provided by Sony™. In another example, the console is a general purpose computer or laptop computer.

The console 105 provides and manipulates data and data structures representing the characteristics, position, and movement of the character, the environment, and additional characters and objects in the environment. According to these data and data structures, the console 105 generates video data to be presented through the display 110 to represent to the user the environment, characters, and objects of the video game. The control commands entered by the user through controller 115 cause the console 105 to adjust the execution of the video game program and adjust the data and data structures for the video game program. For example, as the character moves in the game, the console 105 updates data representing the character's position in the environment. Throughout this description, discussions of the character of the video game and the position and movement of the character, as well as that for the environment and objects in the environment, are to be understood to be referring to the data and data structures representing those elements of the game, as stored and manipulated by the console 105, though, for brevity, the data, data structures, and their manipulation may not be explicitly referenced.

During the execution of the video game program, the user controls the movement of a character through an environment provided by the console 105. The user can cause the character to move in various ways according to game aspects of the video game program, such as walking, running, flying, jumping, swimming, etc. For some types of movement, the user can request the console 105 to select a target for attachment. A moving character can attach to an object in various ways, such as by landing on the object or grabbing the object. When the user requests target selection, the console 105 selects an available target object and adjusts the movement of the character to attach the character to the selected target. As described below, the console 105 determines a cost for each object reflecting the amount of change to be applied to the character's movement to attach the character to that object and selects the object with the best cost.

Figure 2:
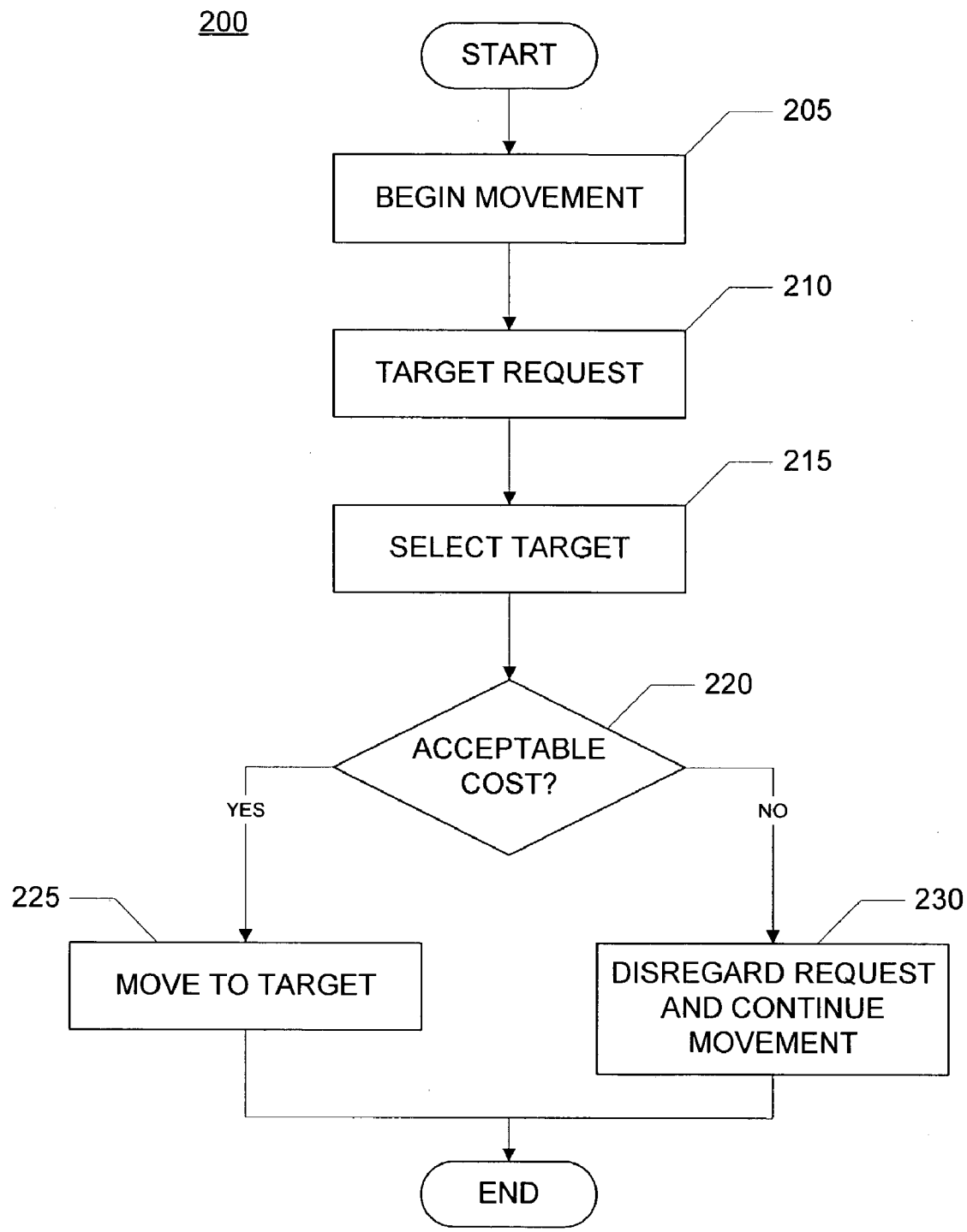
FIG. 2 shows a flowchart of moving and attaching.

FIG. 2 shows a flowchart 200 of moving and attaching. Initially, a character begins moving, block 205. The character can be moving because the player has caused the character to move using the controller, or the character may be caused to move because of other character or object actions or changes in the environment (e.g., the character is knocked off of a building and falls).

While a character is moving, a target selection request is made, block 210. The user can make a request for target selection, such as by pressing an appropriate push button on the controller. In another implementation, a target selection request is not made directly by the user but results from another user action (e.g., jumping off of a building). A request for target selection can also be generated without user interaction from the video game program, such as for a computer-controlled character or while a character is operating according to a script of actions. In one implementation, a target selection request can only be made while a character is moving using a particular type of movement. For example, a target selection request is accepted while the character is jumping, falling, or flying, but not while walking or running.

When the console has received a valid target selection request, the console selects a target for attachment, block 215. The console attaches a character to an object by adjusting the character's movement to cause the character to move to the object. The console and program define some or all objects as being attachable objects. The console selects from the attachable objects one object as the selected target object and attaches the character to the target object. An attachable object has one or more attachment points. The console attaches the character to one attachment point. Part of selecting which object is the target object includes selecting which attachment point of the object to use. Different types of attachable objects can have different types of attachment, such as landing and grabbing. For a landing attachable object, the character's movement is adjusted to bring the character to land on the selected attachment point (e.g., to bring the character to a position where the character's feet are placed appropriately on top of the attachment point). For a grabbing attachable object, the character's movement is adjusted to bring the character to a selected position that is within a reaching or grabbing distance of the selected attachment point. In other implementations, different types of attachment objects are also available, such as enveloping or attacking.

The console selects the attachable object with the best cost. In one implementation, the console first determines which attachable objects are available before calculating costs, or determines whether an object is available before determining the cost for that object. Objects that are not available are objects for which it can be seen that the cost would be too high using an easier test than determining the cost. For example, in one implementation, objects that are very far from the character and the character's predicted path would have a very high cost and so the distance to an object is checked before finding the cost. The console does not find the cost for objects that are not available.

The console determines a cost for each available attachable object and selects the object with the best cost. In one implementation, as described below, the cost for an object reflects the acceleration that would be applied to the character to bring the character to attach to that object. The best cost in this case is the lowest cost, reflecting the smallest amount of change that would be applied.

The console compares the best cost for the selected target object with a maximum cost threshold value, block 220. In one implementation, the console has a maximum acceptable cost to avoid attaching the characters to objects with costs that are very high and may have undesirable effects in the game (e.g., strange movement in the context of the game).

If the best cost is within the maximum cost threshold, the console adjusts the character's movement to attach the character to the target object, block 225. In one implementation, the console determined the path to the selected attachment point in determining the cost for the selected target object. If the path has not already been determined, the console builds the path to the target object. The console moves the character along the new path to the selected attachment point on the target object. In one implementation, the console recalculates the cost of the target object as the character moves to the target object along the path. If the recalculated cost of the path exceeds a threshold, the console abandons the target selection request and cancels the attachment (e.g., allowing the character to continue along the path but not attaching to the former target object). In another implementation, the console adjusts the path of the character to compensate for movement of the target object. As the console adjusts the path for a moving target object, the console also recalculates the cost of the target object according to the new path. If the cost of the new path exceeds a threshold, the console abandons the target selection request and cancels the attachment (e.g., allowing the character to continue along the last generated path). In another implementation, the console checks the path to the target object for obstructions (including obstructions that were not previously an obstruction) and adjusts the path to avoid the obstruction. Alternatively, the console abandons the target selection request and allows the character to continue on the path and collide with the obstruction. In another implementation, when the console abandons a target object, the console uses the available object with the next best cost as a replacement target object, returning to block 220.

If the best cost is above the maximum cost threshold, the console disregards the target selection request and continues to move the character as though the request had not been made, block 230. Under some circumstances, there may not be any available attachable object with a cost that is below the threshold. For example, while several attachable objects are positioned close enough to the character to be considered available, the cost for each may be too high because of the character's movement or because of obstructing objects or aspects of the environment.

Figure 3:
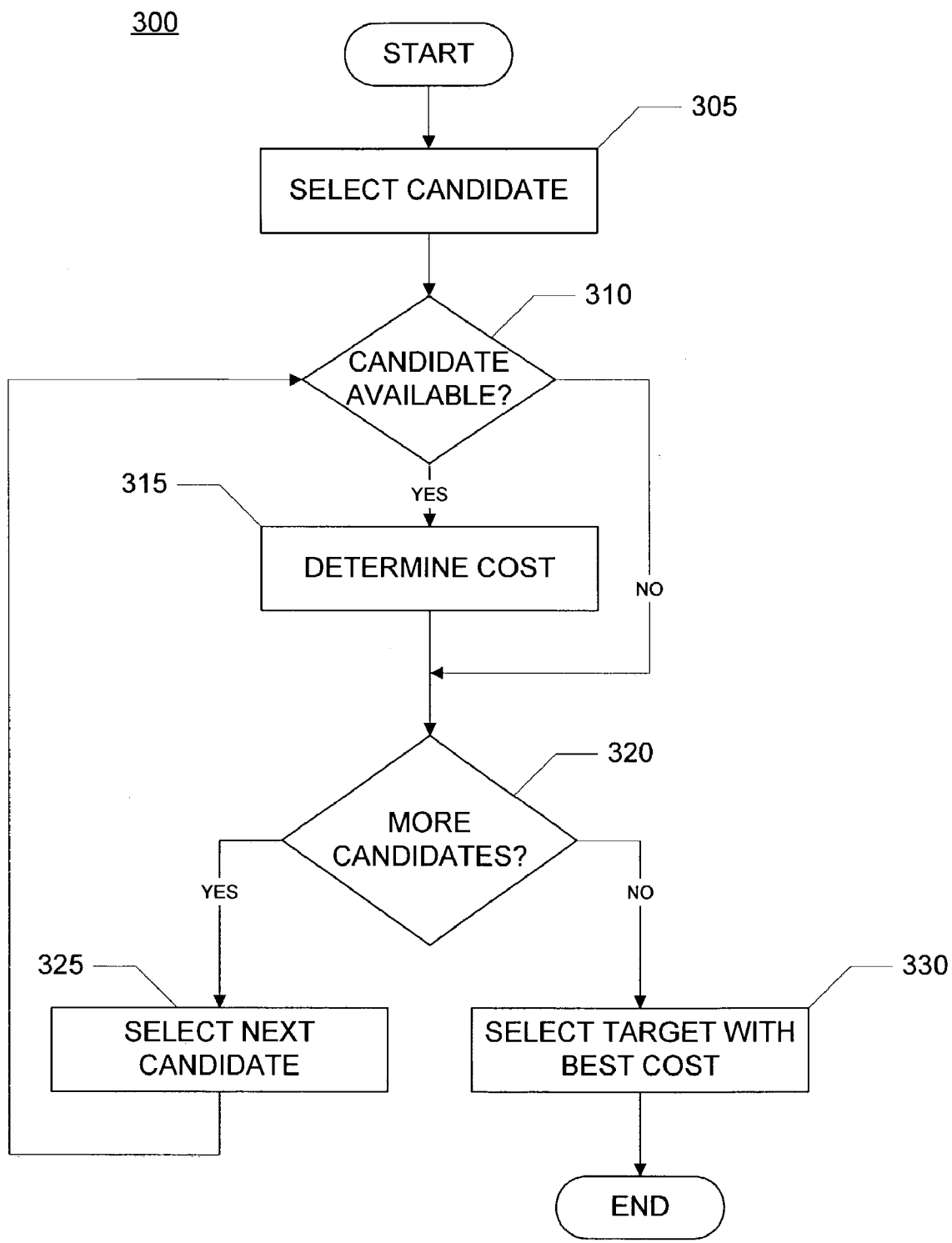
FIG. 3 shows a flowchart of one implementation of selecting a target object.

FIG. 3 shows a flowchart 300 of one implementation of selecting a target object, such as for block 215 of FIG. 2. The console selects an attachable object as a candidate object, block 305. The environment of the game includes one or more attachable objects. The environment may also include non-attachable objects (i.e., objects to which the character will not be attached through a select target request). The console selects one of the attachable objects in the environment as a candidate object to evaluate the cost for the object. In one implementation, the console maintains a list of attachable objects and initially selects the first attachable object in the list.

The console determines whether the candidate object is available, block 310. Before evaluating the cost for a candidate object, the console performs a preliminary test that will indicate if the candidate object is inappropriate to select as the target object. In one implementation, the availability test is faster to perform than the cost determination. In one implementation, the console determines the distance from the current position of the character to the current position of the candidate object. If the candidate object is beyond a threshold distance, the console determines that this candidate object is too far and is not available. In other implementations, different availability tests can be used, such as comparing heights or predicted positions or heights, or limiting certain types of attachable objects to certain status conditions of the character. In one implementation, each type of attachable object has a different availability test. In another implementation, instead of disregarding unavailable objects, the cost for an unavailable object is set to be higher than a maximum cost threshold, ensuring that the object will not be selected. If the candidate object is not available, the console determines if there are more attachable objects to consider, proceeding to block 320, described below.

If the candidate object is available, the console determines the cost of the candidate, block 315. In one implementation, the cost of the candidate represents the amount of change that would be applied to the character's movement to attach the character to the candidate object. This cost is based on approximating an amount of acceleration that would be applied to the character, as described below. In other implementations, different costs can be used, such as evaluating the distance from the character to the candidate object, the time required for the character to reach the candidate object, or the game resources that would be expended in reaching the candidate object. In one implementation, each type of attachable object has a different cost function. In one implementation, the console stores the best cost found so far (e.g., storing the lowest cost). In another implementation, the console stores the cost for each candidate object as the cost is determined. In one implementation, the console stores the path for the best cost and best object as well.

The console determines if there are more attachable objects to be considered as candidate objects, block 320. In one implementation where the console maintains a list of attachable objects, the console checks if the end of the list has been reached.

If there is at least one more attachable object remaining to be considered as a candidate object, the console selects another attachable object as the candidate object, block 325, and determines if the new candidate object is available, returning to block 310.

If there are no more attachable objects to be considered, the console selects the target object as the attachable object that had the best cost, block 330. In one implementation, the best cost is the lowest cost. In this case, the console selects the attachable which has the lowest cost as the target object. As discussed above, if the best cost is above a threshold, the console disregards the target selection request and does not attach the character to an object.

Figure 4:
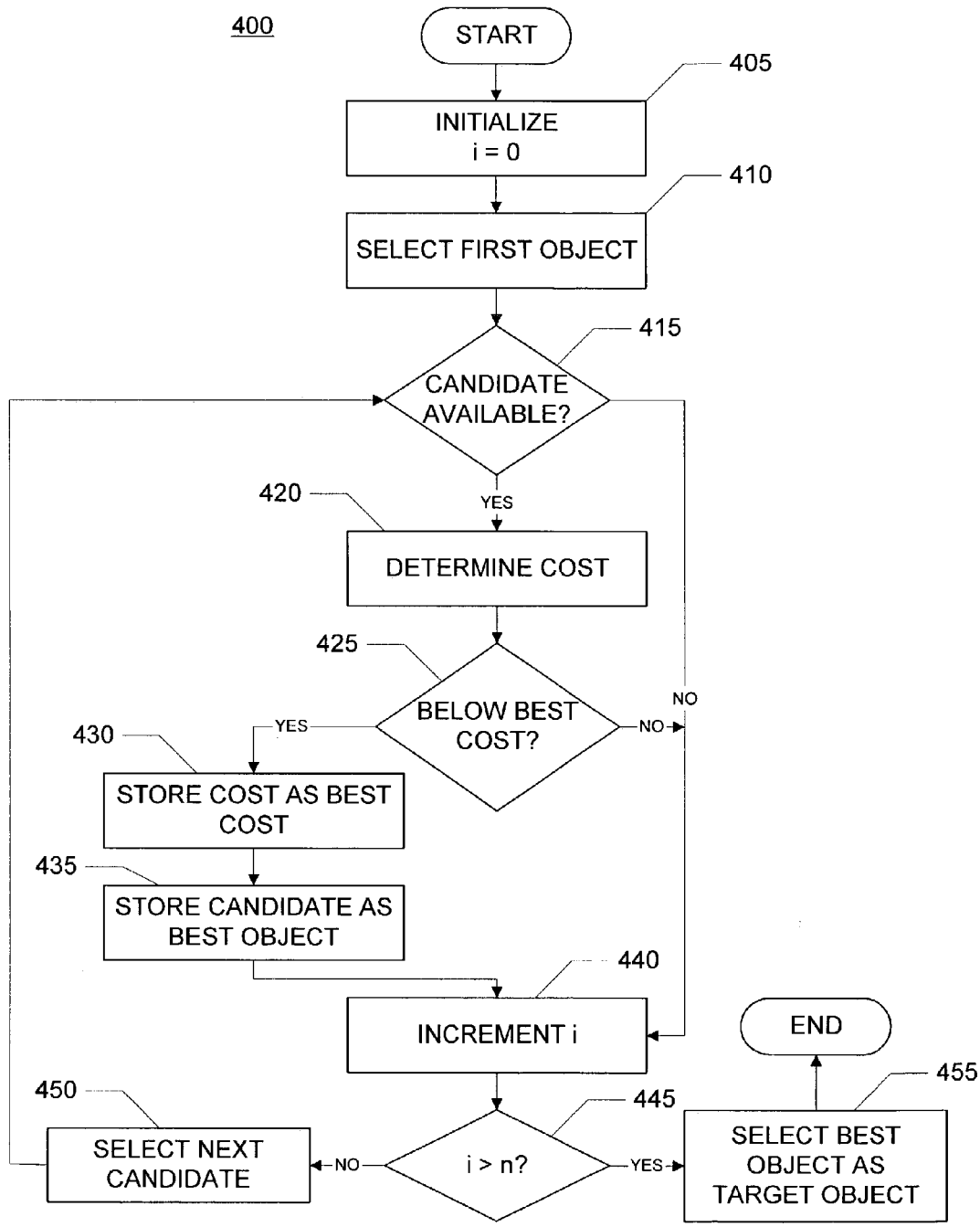
FIG. 4 shows a flowchart of another implementation of selecting a target object.

FIG. 4 shows a flowchart 400 of another implementation of selecting a target object, such as for block 215 of FIG. 2. Similar aspects to those described above referring to FIGS. 2 and 3 are performed similarly in flowchart 400. The console maintains a list of n attachable objects in the environment. The console creates a counter variable i, a best cost variable, and a best object variable. The console initializes the variables, block 405. The console initializes the counter variable i to 1, the best cost variable to predetermined maximum threshold value, and the best object variable to NULL.

The console selects the first attachable object in the list as a candidate object, block 410. The console determines whether the candidate object is available, block 415. If the candidate object is not available, the console increments the counter variable, proceeding to block 440, described below. If the candidate object is available, the console determines the cost for the candidate object, block 420.

The console compares the cost of the candidate object to the cost stored in the best cost variable, block 425. As discussed above, initially the best cost variable stores a maximum cost value. This maximum cost value reflects the maximum acceptable cost for selecting a target object. If the attachment object does not have a cost below the maximum acceptable cost, the attachable object is not an acceptable choice, as described above. If the cost of the candidate object is greater than or equal to the cost stored in the best cost variable, the console increments the counter variable, proceeding to block 440. If the cost of the candidate object is less than the cost stored in the best cost variable, the console stores the cost of the candidate object in the best cost variable, block 430. The console also sets the best object variable to indicate the candidate object, block 435. In one implementation, the best object variable stores a reference to an attachable object and the console stores a reference to the attachable object that is the candidate object in the best object variable.

The console increments the counter variable i, block 440. The console compares the value of the counter variable i with the number of attachable objects n, block 445. If the counter variable is less than or equal to the number of attachable objects, the console selects the next attachable object from the list of attachable objects as the candidate object, block 450, and determines the availability of the new candidate object, returning to block 415.

If the counter variable is greater than the number of attachable objects, the console selects the object indicated by the best object variable as the target object, block 455. In another implementation, the best object variable indicates the value of the counter variable at the time the cost stored in the best cost variable was stored and serves as an index into the list of attachable objects. As discussed above, if the value of the best cost variable is greater than or equal to the maximum cost threshold value, the best cost is too high and the target selection request is discarded. The console does not attach the character to an object. Similarly, if the best object variable is NULL, the console discards the target selection request and does not attach the character to an object.

Figure 5:
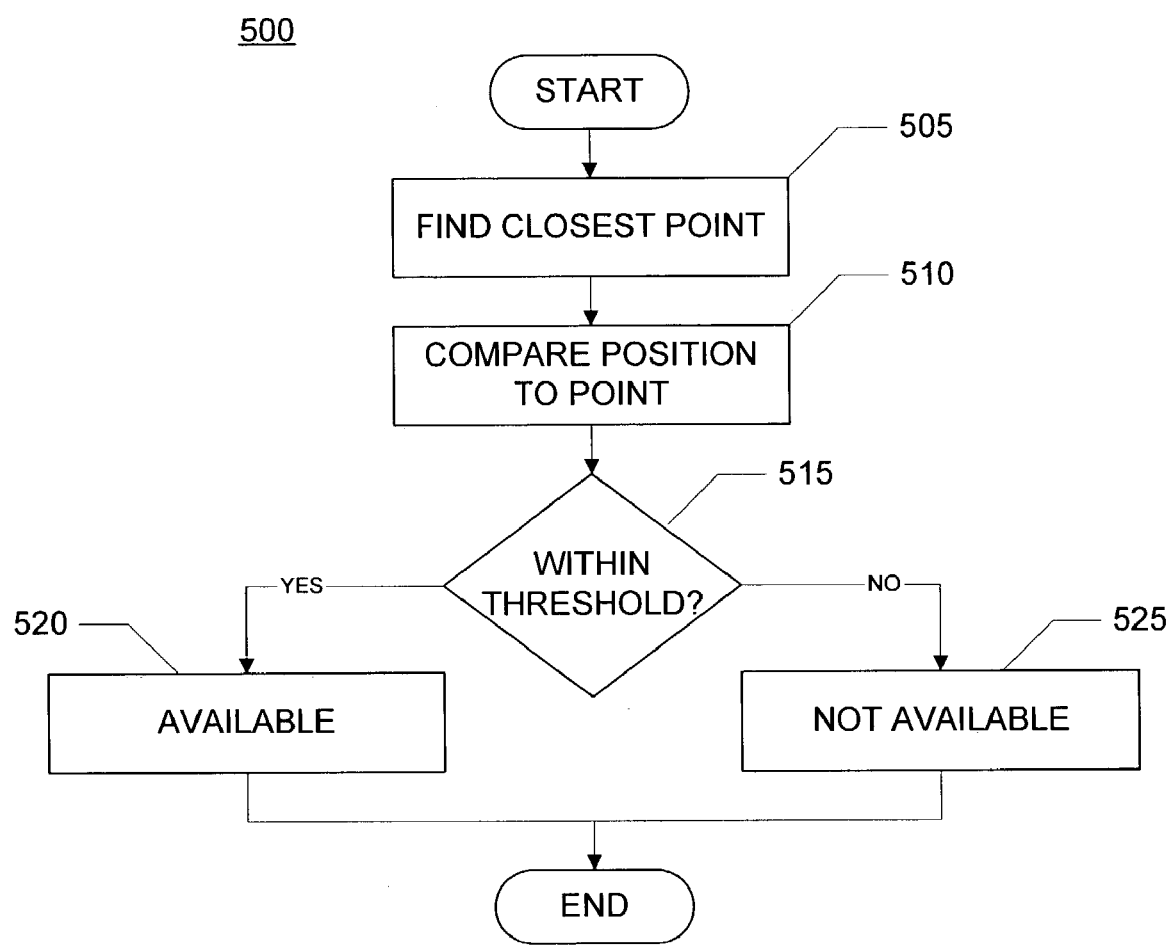
FIG. 5 shows a flowchart of determining the availability of an attachable object.

FIG. 5 shows a flowchart 500 of determining the availability of an attachable object, such as in block 310 of FIG. 3 or block 415 of FIG. 4. The console determines the attachment point closest to the current position of the character, block 505. For some types of attachable objects, the attachable object only has one attachment point. The console compares the current position of the character with the position of the closest attachment point, block 510. In one implementation, each type of attachable object has a different availability test or uses different values in similar tests. In one implementation, the console compares the height of the character's position (e.g., the z value) with the height of the object's position. In another implementation, the console compares the distance between the character's position and the attachment point with a distance threshold.

According to the availability test, the console determines if the closest attachment point is within the test's threshold, block 515. If the point is within the threshold, the attachable object is available, block 520. If the point is outside the threshold, the attachable object is unavailable, block 525. In one implementation using a test comparing heights, if the difference between the heights is too large, the attachable object is not available. In another implementation, if the height of a landing attachable object is above the height of the character's position, or above by more than a defined amount, the landing object is unavailable. In one implementation using a test based on distance, if the distance exceeds the distance threshold, the attachable object is unavailable.

As described above, in one implementation, different types of attachable objects have different cost functions or use different constants in similar cost functions (though some types may share a cost function). In one implementation, the console supports four types of attachable objects: single point landing objects (e.g., spires), multiple point landing objects (e.g., rails), signal point grabbing objects (e.g., handles), and multiple point grabbing objects (e.g., pipes or ropes). These cost functions are used when a character is jumping or falling and the player requests a target selection. Implementations of cost functions for these types of attachable objects are described below in FIGS. 6–9. The character and each attachment point of the attachable object have a position p and a velocity v. Both the position p and velocity v have x, y, and z components: p.x, p.y, p.z, v.x, v.y, and v.z. It should be noted that adjustments to the position and velocity of the character are not put into effect until after the target object has been selected.

Figure 6:
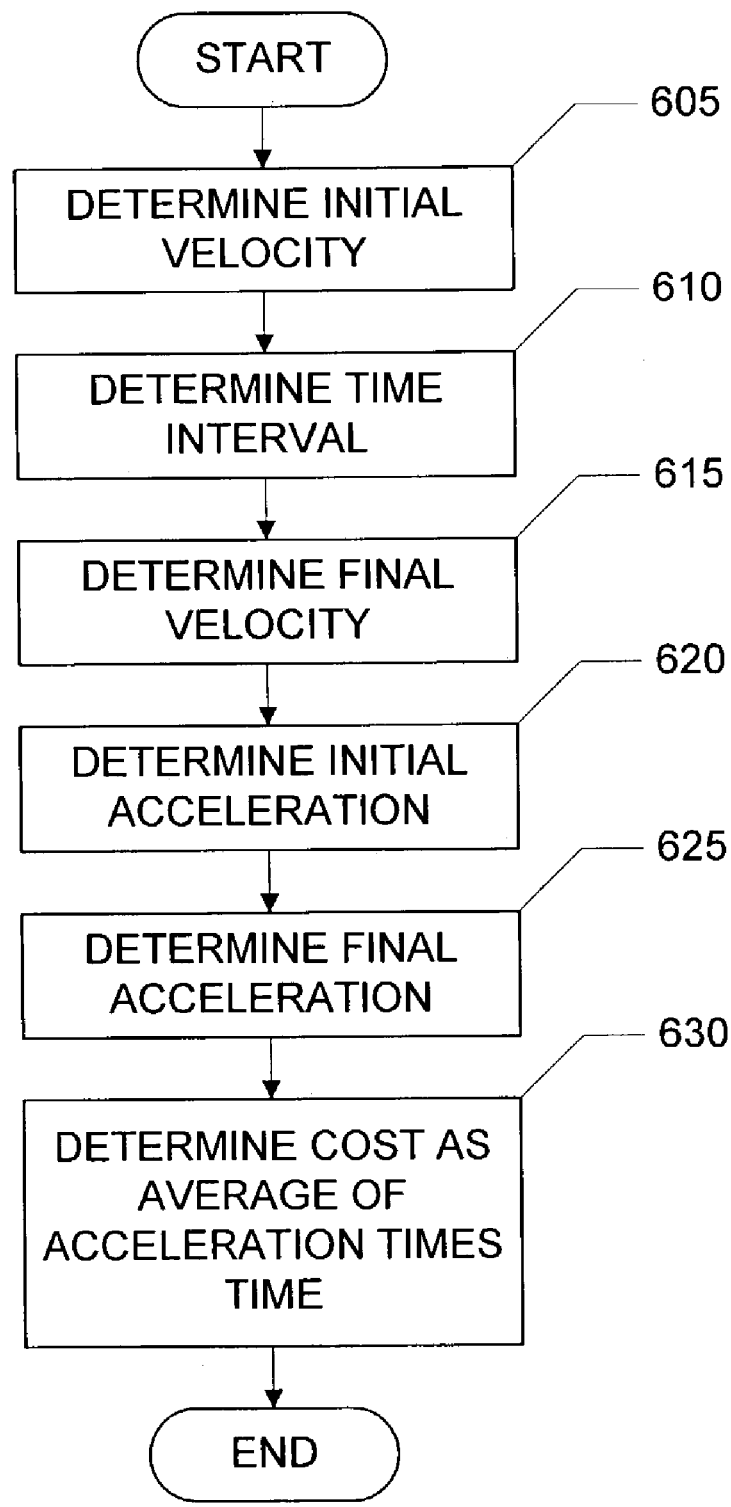
FIG. 6 shows a flowchart of determining the cost for a single attachment point.

FIG. 6 shows a flowchart 600 of determining the cost for a single attachment point, such as for determining the cost for a signal point landing object in block 315 of FIG. 3 or block 420 of FIG. 4. The console determines the initial velocity of the character, block 605. In one implementation, the console uses the position and velocity at the time the target request is made as the initial position and initial velocity. In one implementation, the console adjusts the initial velocity of the character by adjusting one or more of the velocity components. For example, the console increases the z component of the initial velocity, giving the character a boost to provide additional height and time to reach the attachment point.

The console determines the time required to move from the character's initial position to the attachment point, block 610. The initial position and final position of this movement are known. The initial position $p_0$ is the character's current position. The final position $p_1$ is the position of the attachment point or a point derived from the attachment point according to the configuration of the character (e.g., the position of the character standing on the object at the attachment point). In another implementation, the final position $p_1$ is a predicted position of the attachment point. The initial velocity $v_0$ has been determined. The z component of acceleration $a.z$ is known (a representation of gravity). Accordingly, the console solves the following quadratic equation for the time T to reach $p_1$:

$$p_1.z = p_0.z + v_0 z * T + \tfrac{1}{2} a.z T^2$$

The console determines the final velocity, block 615. The x and y components of the final velocity $v_1$ are 0 ($v_1.x = v_1.y = 0$). If the attachable object is moving, the final velocity is set to the velocity of the attachment point. For example, the x and y components of the relative final velocity of the character (relative to the attachment point) are 0, but the relative final velocity of the character in the environment is non-zero if the attachment point is moving. In one implementation, a further adjustment is made to the final velocity based on control inputs from the user (e.g., joystick movement). The console determines the z component of the final velocity based on the following equation:

$$v_1.z = v_0.z + T * a.z$$

In an alternative implementation, the console sets the final velocity $v_1$ to be 0 (all three components) or to be the same as the velocity of the attachable object or point.

The console determines the initial acceleration, block 620. The console has established the initial position $p_0$, the initial velocity $v_0$, the final position $p_1$, the final velocity $v_1$, and the time interval T. The console builds a Bezier curve from the initial position to the final position according to the velocities and the time interval using a Bezier basis function. The acceleration will be the second derivative of this curve. In another implementation, the console uses a curve to derive the acceleration. Where t represents time from 0 to T, and u=t/T, for the initial acceleration $a_0$, t is 0 and so u is 0. The acceleration is represented generally as the following equation:

$$a = (6 - 12*u)*(p_1 - p_0)/(T*T) +$$
$$(6*u - 4)*v_0/T +$$
$$(6*u - 2)*v_1/T$$

The console determines the final acceleration, block 625. As noted above, the initial acceleration $a_0$ is found using t=0. The final acceleration $a_1$, is found using the same equation for a using t=T (and so u=1).

The console determines the cost using the acceleration, block 630. The cost is a representation of the integral of the acceleration equation over time T. The console approximates the integral to find the cost c by multiplying the average of the initial acceleration $a_0$ and the final acceleration $a_1$ by the time T, using the following equation:

$$c = 0.5*(a_0 = a_1)*T$$

The console uses the determined cost c as the cost for this attachment point. For the single point attachable object, this cost is then the cost for the attachable object.

Figure 7:
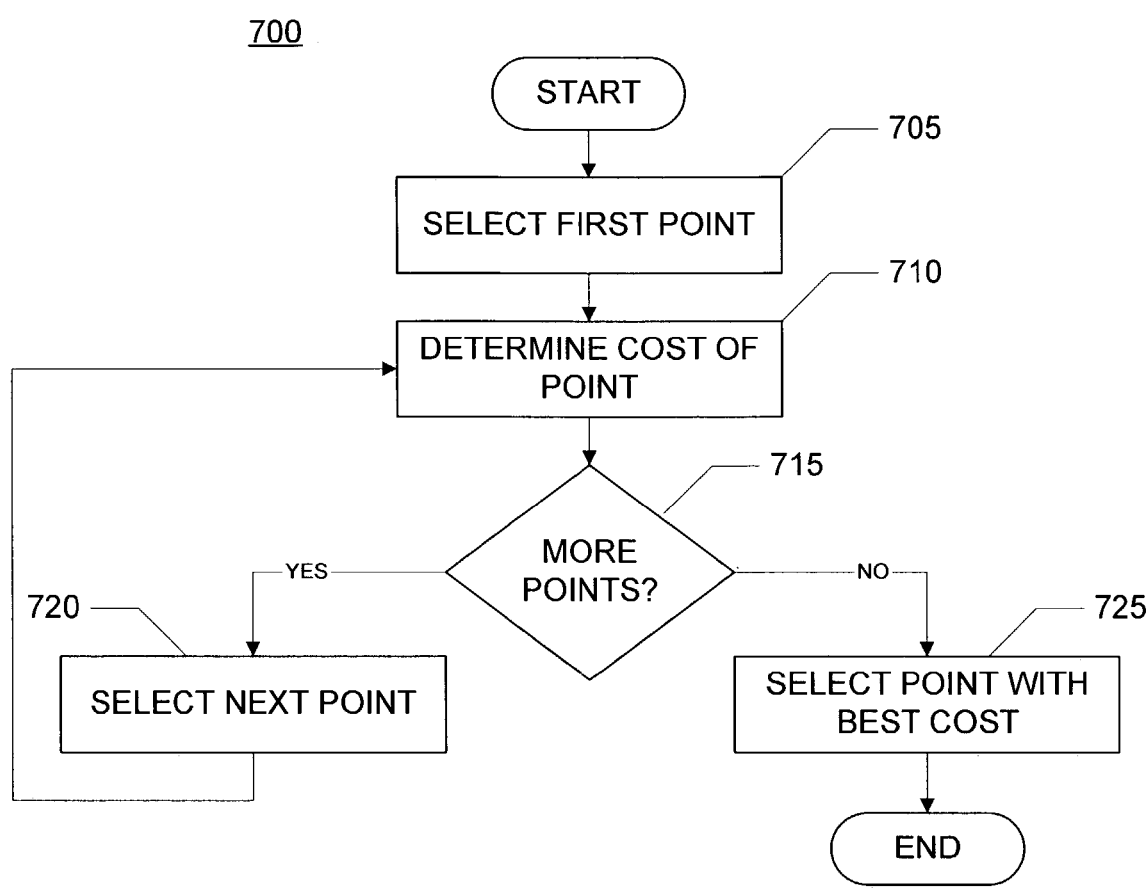
FIG. 7 shows a flowchart of determining the cost for a multiple point attachable object.

FIG. 7 shows a flowchart 700 of determining the cost for a multiple point attachable object, such as for determining the cost for a multiple point landing object in block 315 of FIG. 3 or block 420 of FIG. 4. The multiple point attachable object has a series of attachment points, with a point at one end designated as the first or beginning point, and the point at the other end designated as the last or ending point. Each attachment point can have different values for the x, y, and z components (e.g., an undulating or tilted line) or some values can be the same (e.g., a straight planar line). In one type of multiple point attachable object, the attachment points define a circle, however, one point is still designated as the beginning and one point is designated as the end. In one example of a circle attachable object, the circle is defined by a center and a radius.

The console selects the first attachment point in the attachable object, block 705. The console starts with the attachment designated as the beginning point. The console determines the cost of the selected attachment point, block 710. The console uses the process shown in flowchart 600 of FIG. 6 to determine the cost of the attachment point. The console determines if there are more attachments points remaining, block 715. After the console has determined the cost of the ending point of the attachable object, there are no more points. If there is at least one more point remaining, the console selects the next point in the series of attachment points, block 720, and determines the cost of the new point, returning to block 710. If there are no points remaining, the console selects the attachment point having the lowest cost as the representative attachment point for the attachable object, block 725. The console uses the cost for the representative attachment point as the cost for the attachable object and also uses the representative attachment point as the attachment point for attaching the character if the attachable object is selected as the target object.

In other implementations, different minimization techniques can be used. The cost for attachment points in the series are evaluated and compared to determine the attachment point having the minimum cost. For example, in one implementation, the cost for an attachment point is compared to the costs of attachment points on either side. Considering the first three points as points 1, 3, and 5, where point 3 has a lower cost than points 1 and 5, the console selects a point between points 1 and 3 as point 2 and a point between points 3 and 5 as point 4 (e.g., where points 2 and 4 are mid-points between points 1 and 3 and between points 3 and 5, respectively). The console determines which of the sequences of points 1–2–3, 2–3–4, or 3–4–5 has the middle point with the lowest cost. The console then repeats the process until a desired level of precision has been reached. For example, where point 2 is the middle point with the lowest cost, the console selects middle points between points 1 and 2 and between points 2 and 3 and again finds the lowest cost middle point, and so on. In another example, only a subset of the attachment points are considered based on external factors, such as the relative position of the character. In another implementation, a similar technique is applied to a multiple point attachable object having a two-dimensional area of points, using a two-dimensional minimization technique.

Figure 8:
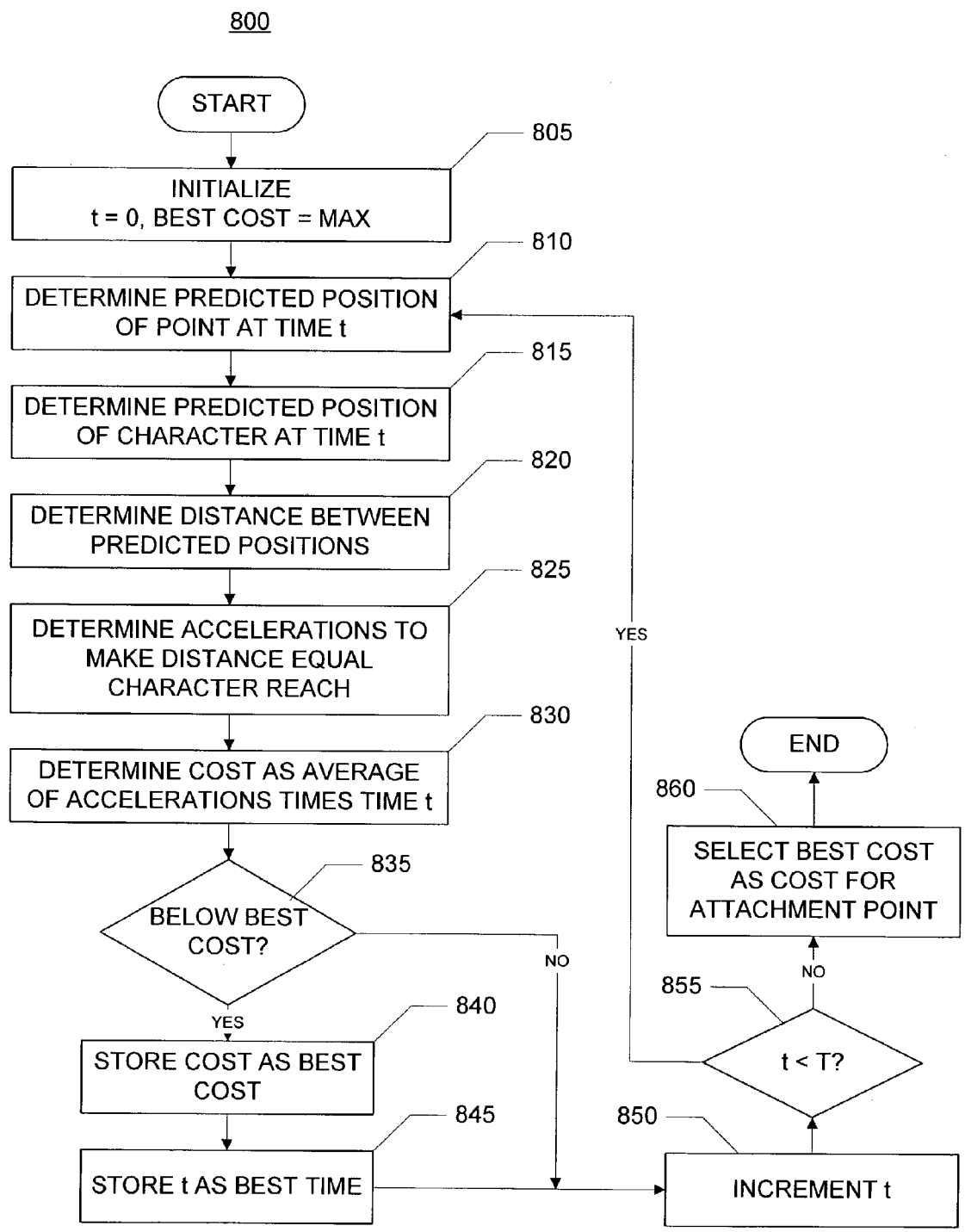
FIG. 8 shows a flowchart of determining the cost for a single point grabbing attachable object.

FIG. 8 shows a flowchart 800 of determining the cost for a single point grabbing attachable object, such as for determining the cost for a signal point grabbing object in block 315 of FIG. 3 or block 420 of FIG. 4. The cost for grabbing a grabbing object is also referred to as the reach cost. The console defines a time interval T representing an amount of time to evaluate the predicted path of the character from the time the target selection request is made. Initially, the console initializes variables for determining the reach cost, block 805. The console sets a time counter variable t to 0, and a best cost variable to a maximum value. The time counter variable t ranges from 0 (when the target selection request is made) to T (the end of the evaluation interval).

The console determines the predicted position of the attachment point at time t, block 810. At t=0, the predicted position is the initial position. For t>0, the console uses the initial position, velocity, and any acceleration of the attachment point to predict the position. In another implementation, the console also uses additional information to predict the position of the attachment point, such as a set motion of the object.

The console determines the predicted position of the character at time t, block 815. At t=0, the predicted position is the initial position. For t>0, the console uses the initial position, velocity, and any acceleration of the character to predict the position. When the character is jumping or falling, the acceleration represents the effect of gravity. The predicted position here is the predicted position assuming the path is not adjusted (e.g., before applying any modifications for attachment based on the current target selection request).

The console determines the distance between the predicted position of the attachment point and the predicted position of the character, block 820. The distance is the difference distance.

The console determines the lowest acceleration to apply to the character to make the difference distance match the reach distance of the character, block 825. The character has a reach distance, indicating how far in the environment the character can reach to grab onto an object. The reach distance is measured from the character's position. When the reach distance equals the difference distance, the character is properly positioned to attach to the attachment point (i.e., grab the object). The console adjusts one or more of the x, y, and z components of acceleration to match the reach distance. In one implementation, the console finds the acceleration by adjusting the z component of acceleration only, leaving the x and y components of acceleration fixed. This simplifies the available solution to a single solution (solutions on the opposite side of the object from the character are discarded). If multiple solutions are present, the cost for each is found and the solution with the lower cost is used. This adjustment has an effect similar to adjusting the representation of gravity. In another implementation, the console determines a parabola based on the character's initial position, velocity, and acceleration and finds the closest point to that parabola on a sphere centered on the predicted position of the attachment point and having a radius equal to the character's reach distance. The console then determines the lowest acceleration to change the parabola to a new parabola from the character's initial position to the found point on the sphere.

The console determines the cost using the determined acceleration, block 830. The determined acceleration defines an equation (as the second derivative of the position equation), and the cost is the integral of the acceleration equation over the interval T. As with a single point cost discussed above referring to FIG. 6, in one implementation, the cost is generated by using the average of the initial and final accelerations times the time interval. The calculation is represented by the following equation, where c is the cost, $a_0$ is the initial acceleration at t=0, and $a_1$, is the final acceleration at t=T:

$$c=0.5*(a_0=a_1)*T$$

The console compares the cost to the cost stored in the best cost variable, block 835. As discussed above, initially the best cost variable stores a maximum cost value. This maximum cost value reflects the maximum acceptable cost for selecting a target object. If the attachment object does not have a cost below the maximum acceptable cost, the attachable object is not an acceptable choice. If the cost is greater than or equal to the value stored in the best cost variable, the console increments the time counter variable t, proceeding to block 850.

If the cost is less than the value stored in the best cost variable, the console stores the cost in the best cost variable, block 840. The console also stores the value of the time counter variable in a best time variable, block 845. In one implementation, the console uses the best time variable to recalculate the cost and path for the best cost and time as appropriate.

The console increments the time counter variable t, block 850. The console compares the value of the time counter variable t to the value of the time interval T, block 855. If t is less than T, the console determines the predicted position of the attachment point at the new time t, returning to block 810. If t is greater than or equal to T, the console selects the best cost as the cost for the attachment point, block 860. The console has found the best cost during the time interval T and has determined the path to use to attach the character to the attachment point, if this attachment point and attachable object are selected as the target object.

Figure 9:
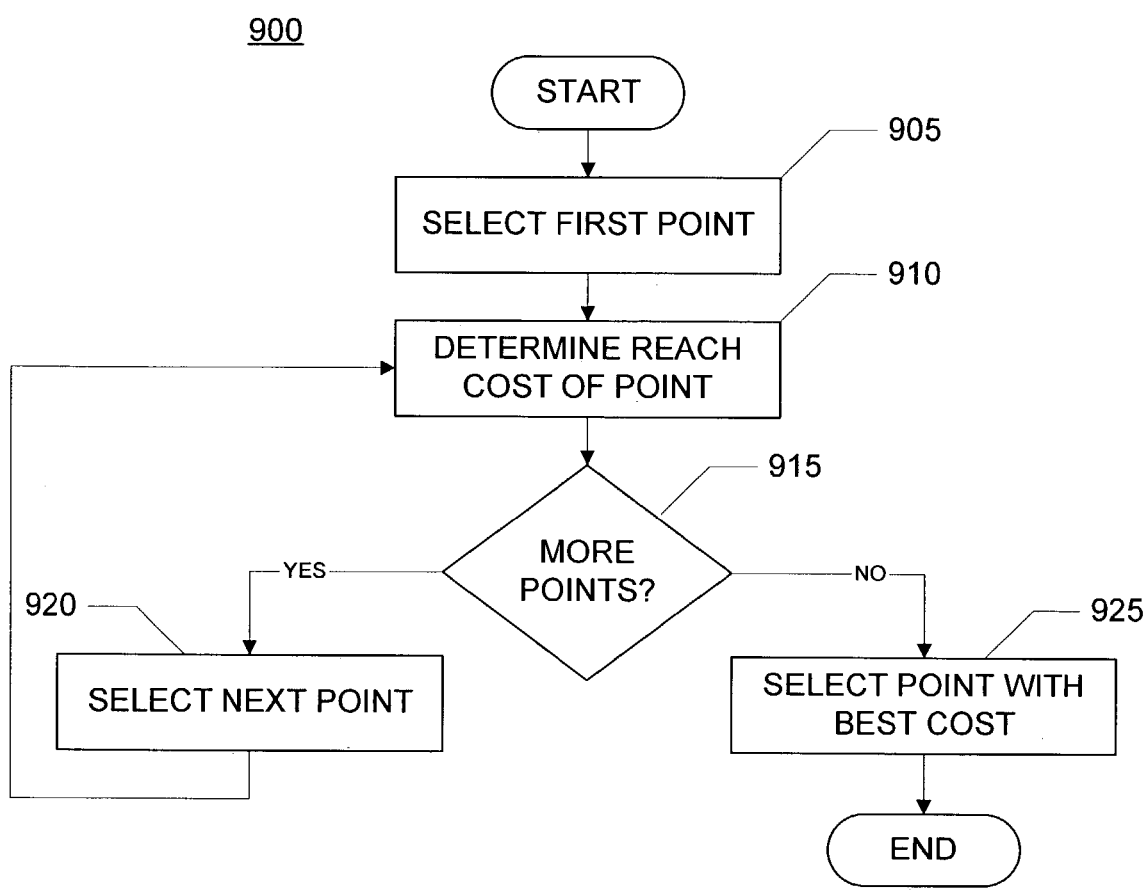
FIG. 9 shows a flowchart of determining the cost for a multiple point grabbing attachable object

FIG. 9 shows a flowchart 900 of determining the cost for a multiple point grabbing attachable object, such as for determining the cost for a multiple point grabbing object in block 315 of FIG. 3 or block 420 of FIG. 4. Similar to a multiple point landing object, a multiple point grabbing object has a series of attachment points, with a point at one end designated as the first or beginning point, and the point at the other end designated as the last or ending point. Each attachment point can have different values for the x, y, and z components (e.g., an undulating or tilted line) or some values can be the same (e.g., a straight planar line). In one type of multiple point attachable object, the attachment points define a circle, however, one point is still designated as the beginning and one point is designated as the end. In one example of a circle attachable object, the circle is defined by a center and a radius.

The console selects the first attachment point in the attachable object, block 905. The console starts with the attachment designated as the beginning point. The console determines the reach cost of the selected attachment point, block 910. The console uses the process shown in flowchart 800 of FIG. 8 to determine the reach cost of the attachment point. The console determines if there are more attachments points remaining, block 915. After the console has determined the reach cost of the ending point of the attachable object, there are no more points. If there is at least one more point remaining, the console selects the next point in the series of attachment points, block 920, and determines the reach cost of the new point, returning to block 910. If there are no points remaining, the console selects the attachment point having the lowest reach cost as the representative attachment point for the attachable object, block 925. The console uses the reach cost for the representative attachment point as the cost for the attachable object and also uses the representative attachment point as the attachment point for attaching the character if the attachable object is selected as the target object. As discussed above referring to FIG. 7, in other implementations, different minimization techniques can be used.

In other implementations, variations and additions to the techniques and processes described above are also applied.

In one implementation, after determining the cost for an attachable object based on acceleration, the console applies additional adjustments to the cost. This adjustment can be a penalty that raises the cost to make that object less likely to be selected as the target object, or a bonus that reduces the cost to make that object more likely to be selected as the target object. These adjustments can be used to adjust play balance. For example, some types of attachable objects, or particular attachable objects, may have assigned preferences (e.g., spires receive a bonus while pipes received a penalty). In another example, the last object from which the character jumped (or otherwise left) receives a penalty (e.g., to avoid jumping back on to the object the character just jumped from). In another example, bonuses and penalties are applied according to the game or character state (e.g., when the character is wearing or carrying a special item, a bonus is applied to rails and spires). In another example, bonuses and penalties are applied according to a difficulty setting (e.g., at a harder difficulty level, higher penalties are applied and so less assistance is given in reaching objects). In another example, bonuses and penalties are applied depending on additional commands entered by the user (e.g., through additional button presses and/or joystick movement).

In another implementation, the console supports attachable objects having more than one dimension of attachment points. In examples discussed above, attachable objects had a single attachment point, or a one-dimensional series of attachment points. In another implementation, the console supports attachable objects having two-dimensional or three-dimensional series of attachment points. For example, the console supports attachable objects with surfaces or multiple surfaces of attachment points.

In another implementation, the console provides different types of attachment for the same attachable object. In examples discussed above, an object was described as a landing object or a grabbing object. In another implementation, an object is a landing object and a grabbing object. When the character is above the object, the object is treated as a landing object. When the character is not above the object, the object is treated as a grabbing object. In addition, the console supports different types of attachments and/or animations for attaching to the same object depending on the context of the attachment. For example, if the character's velocity is above a certain threshold, the character is attached to the target object as landing and falling down or bouncing, while if below the threshold the character is attached as landing and remaining standing.

In another implementation, at times in the game, scripts of actions are used to control a character ordinarily controlled by the player. In the scripts, target selections may be requested, but a predetermined target object can be indicated to force the script. Similarly, when the computer is controlling a computer-controller character, the computer can request a target selection and force a selection or weight a selection.

In another implementation, the target selection is repeatedly evaluated after the target object has been selected until the character reaches the target object. In this case, the console may switch the character to a different target object if the game situation changes and a better attachable object arises. If the cost for the currently selected object becomes higher than a maximum threshold, the console ends the attachment and causes the character to proceed without further adjustment to the path ("naturally").

In another implementation, different types of attachment are supported. In one example, the target selection request requests a target to be struck rather than grabbed. In another example, the target selection request requests a target to be passed through (e.g., a gate). In another implementation, attachment to objects while the character is stationary is supported. For example, the character can attach a flexible or extendible appendage to a target object and draw the object to the character. In another implementation, the attachment is unrelated to movement at all and reflects an adjustment to the player activity to provide an improved result without unduly changing the game state. For example, in a music game, a target selection request requests a tone that is in a consistent pattern of progression with previous tones effected by the player.

In another implementation, the cost is based on factors in addition to or instead of acceleration. For example, the attachable objects are evaluated for how much of a resource will be expended in reaching the candidate object. In another example, the predicated velocity after attaching to the object is evaluated and how that velocity differs from the current velocity forms the cost. In one example, a character can move by swinging from one object to another by attaching a rope or other connecter to an object. There are many objects to attach to, such as buildings or trees. When the player is attempting to connect to the next object and a target selection request is made, the console evaluates the amount of connecter to use to connect to the candidates and to what extent swinging from the candidate object is consistent with the character's current velocity.

The various implementations of the invention are realized in electronic hardware, computer software, or combinations of these technologies. Most implementations include one or more computer programs executed by a programmable computer. For example, referring to FIG. 1, in one implementation, the video game console 105 includes one or more computers executing software implementing the selection of targets for attachment. In general, each computer includes one or more processors, one or more data-storage components (e.g., volatile or non-volatile memory modules and persistent optical and magnetic storage devices, such as hard and floppy disk drives, CD-ROM drives, and magnetic tape drives), one or more input devices (e.g., mice and keyboards), and one or more output devices (e.g., display consoles and printers).

The computer programs include executable code that is usually stored in a persistent storage medium and then copied into memory at run-time. The processor executes the code by retrieving program instructions from memory in a prescribed order. When executing the program code, the computer receives data from the input and/or storage devices, performs operations on the data, and then delivers the resulting data to the output and/or storage devices.

Various illustrative implementations of the present invention have been described. However, one of ordinary skill in the art will see that additional implementations are also possible and within the scope of the present invention. For example, while the above description describes several implementations of selecting targets for attachment in the context of a video game system, a general computer system can also be used and the target selection can be applied to software programs other than video games, such as in a virtual reality environment. Accordingly, the present invention is not limited to only those implementations described above.

What is claimed is:

1. A method of selecting a target for attachment by a moving character in a video game, wherein the character has a position and a velocity, the method comprising:
    selecting one of a plurality of attachable objects as a candidate object, wherein each attachable object is of an object type from among one or more object types;
    determining if the candidate object is available according to the current position of the character and the object type of the candidate object; and
    if the candidate object is available, determining a cost for the candidate object according to the position and velocity of the character and the object type of the candidate object, wherein the cost represents an acceleration to attach the character to the candidate object.

2. A method according to claim 1, further comprising:
    comparing the cost of the candidate object to the cost of one or more other attachable objects;
    selecting the attachable object with the lowest cost as a target object.

3. A method according to claim 2, further comprising:
    causing the character to move to attach to the selected target object;
    determining an updated cost for the selected target object again as the character moves to attach to the selected target object; and
    if the updated cost exceeds an updated cost threshold, abandoning attaching the character to said target object.

4. A method according to claim 1, further comprising:
    comparing the cost of the candidate object to a maximum cost threshold; and
    if the cost of the candidate object is above the maximum cost threshold, disregarding the candidate object.

5. A method according to claim 1, further comprising:
    receiving a signal indicating a user of the video game has pressed a button on a manual controller requesting a selection of a target object; and
    selecting the candidate object in response to receiving said signal.

6. A method according to claim 1, wherein
    determining if the candidate object is available includes comparing the height of the candidate object's position with the height of the character's position.

7. A method according to claim 1, wherein
    the candidate object has one or more attachment points; and
    determining a cost for the candidate object includes determining a cost for each attachment point of the candidate object and selecting the attachment point and the cost for that attachment point that has the lowest cost.

8. A method according to claim 7, wherein
    determining a cost for an attachment point of the candidate object includes building a path from the current position of the character to the attachment point.

9. A method according to claim 8, wherein
    the path is a Bezier curve.

10. A method according to claim 7, wherein
    determining a cost for an attachment point of the candidate object includes:
    determining the initial position, initial velocity, and final position of the character, wherein the initial position and the initial velocity are the position and velocity at the time a request for selecting a target is made, and the final position is the position of the character attached to the attachment point;
    determining the time interval for the character to reach the final position from the initial position;
    determining the final velocity of the character;
    determining the initial acceleration and the final acceleration of the character using a Bezier curve representing the path from the initial position to the final position;
    determining the cost for the attachment point as product of the time interval and the average of the initial acceleration and the final acceleration.

11. A method according to claim 7, wherein
    determining a cost for an attachment point of the candidate object includes:
    determining a predicted position of the attachment point at a time t;
    determining a predicted position of the character at the time t;
    determining a difference distance between the predicted position of the attachment point and the predicted position of the character;
    determining the initial acceleration and the final acceleration of the character to make the different distance equal a reach distance of the character using a curve representing the path from the initial position of the character to a final position of the character, wherein the final position of the character is the position of the character attached to the attachment point at the predicted position of the attachment point;
    determining the cost for the attachment point as the product of a time interval and the average of the initial acceleration and the final acceleration, wherein the time interval is the time for the character to reach the final position.

12. A method according to claim 1, wherein
    determining a cost for the candidate object includes evaluating the amount of change to be applied to the movement of the character.

13. A method according to claim 1, wherein
    the movement of the character is jumping; and
    attachment to an attachable object includes landing on an attachable object or grabbing an attachable object.

14. A method according to claim 1, wherein
    determining a cost for the candidate object includes evaluating the current position and movement of the candidate object.

15. A computer program, stored on a tangible storage medium, for use in selecting a target for attachment by a moving character in a video game, wherein the character has a position and a velocity, the program comprising executable instructions that cause a computer to:

select one of a plurality of attachable objects as a candidate object, wherein each attachable object is of an object type from among one or more object types;

determine if the candidate object is available according to the current position of the character and the object type of the candidate object; and if the candidate object is available, determine a cost for the candidate object according to the position and velocity of the character and the object type of the candidate object, wherein the cost represents an acceleration to attach the character to the candidate object.

16. A computer program according to claim 15, further comprising executable instructions that cause a computer to:

compare the cost of the candidate object to the cost of one or more other attachable objects;

select the attachable object with the lowest cost as a target object.

17. A computer program according to claim 16, further comprising executable instructions that cause a computer to:

cause the character to move to attach to the selected target object;

determine an updated cost for the selected target object again as the character moves to attach to the selected target object; and if the updated cost exceeds an updated cost threshold, abandon attaching the character to said target object.

18. A computer program according to claim 15, further comprising executable instructions that cause a computer to compare the cost of the candidate object to a maximum cost threshold; and if the cost of the candidate object is above the maximum cost threshold, disregard the candidate object.

19. A computer program according to claim 15, further comprising executable instructions that cause a computer to:

process a received a signal indicating a user of the video game has pressed a button on a manual controller requesting a selection of a target object; and select the candidate object in response to said signal.

20. A computer program according to claim 15, wherein determining if the candidate object is available includes comparing the height of the candidate object's position with the height of the character's position.

21. A computer program according to claim 15, wherein the candidate object has one or more attachment points; and determining a cost for the candidate object includes determining a cost for each attachment point of the candidate object and selecting the attachment point and the cost for that attachment point that has the lowest cost.

22. A computer program according to claim 21, wherein determining a cost for an attachment point of the candidate object includes building a path from the current position of the character to the attachment point.

23. A computer program according to claim 22, wherein the path is a Bezier curve.

24. A computer program according to claim 21, wherein determining a cost for an attachment point of the candidate object includes:

determining the initial position, initial velocity, and final position of the character, wherein the initial position and the initial velocity are the position and velocity at the time a request for selecting a target is made, and the final position is the position of the character attached to the attachment point;

determining the time interval for the character to reach the final position from the initial position;

determining the final velocity of the character;

determining the initial acceleration and the final acceleration of the character using a Bezier curve representing the path from the initial position to the final position;

determining the cost for the attachment point as product of the time interval and the average of the initial acceleration and the final acceleration.

25. A computer program according to claim 21, wherein determining a cost for an attachment point of the candidate object includes:

determining a predicted position of the attachment point at a time t;

determining a predicted position of the character at the time t;

determining a difference distance between the predicted position of the attachment point and the predicted position of the character;

determining the initial acceleration and the final acceleration of the character to make the different distance equal a reach distance of the character using a curve representing the path from the initial position of the character to a final position of the character, wherein the final position of the character is the position of the character attached to the attachment point at the predicted position of the attachment point;

determining the cost for the attachment point as the product of a time interval and the average of the initial acceleration and the final acceleration, wherein the time interval is the time for the character to reach the final position.

26. A computer program according to claim 15, wherein determining a cost for the candidate object includes evaluating the amount of change to be applied to the movement of the character.

27. A computer program according to claim 15, wherein the movement of the character is jumping; and attachment to an attachable object includes landing on an attachable object or grabbing an attachable object.

28. A computer program according to claim 15, wherein determining a cost for the candidate object includes evaluating the current position and movement of the candidate object.

29. A system for selecting a target for attachment by a moving character in a video game, wherein the character has a position and a velocity, the system comprising:

selecting means for selecting one of a plurality of attachable objects as a candidate object, wherein each attachable object is of an object type from among one or more object types;

availability determining means for determining if the candidate object is available according to the current position of the character and the object type of the candidate object; and cost determining means for determining, if the candidate object is available, a cost for the candidate object according to the position and velocity of the character and the object type of the candidate object, wherein the cost represents an acceleration to attach the character to the candidate object.

30. A system according to claim 29, wherein
wherein said selecting means, said availability determining means, and said cost determining means are included in a video game console.

31. A system according to claim 30, wherein
at least part of one or more of said selecting means, said availability determining means, and said cost determining means is loaded into said video game console from a removable storage device.

32. A system according to claim 30, further comprising:
a controller having at least one push button;
wherein when said video game console receives a signal indicating a user of the video game console has pressed a button on said controller requesting a selection of a target object, said selecting means selects the candidate object in response to receiving said signal.

33. A method of selecting a target for attachment by an entity to an object in a computer-generated environment, wherein the entity has a state, the method comprising:
selecting one of a plurality of attachable objects as a candidate object, wherein each attachable object is of an object type from among one or more object types;
determining if the candidate object is available according to the current state of the entity and the object type of the candidate object; and
if the candidate object is available, determining a cost for the candidate object according to the state of the entity and the object type of the candidate object, wherein the cost represents an amount of change predicted to be required to attach the entity to the candidate object.

* * * * *